No. 718,580. PATENTED JAN. 13, 1903.
J. PLAYER & G. G. FLOYD.
CAR TRUCK.
APPLICATION FILED AUG. 4, 1902.
NO MODEL.
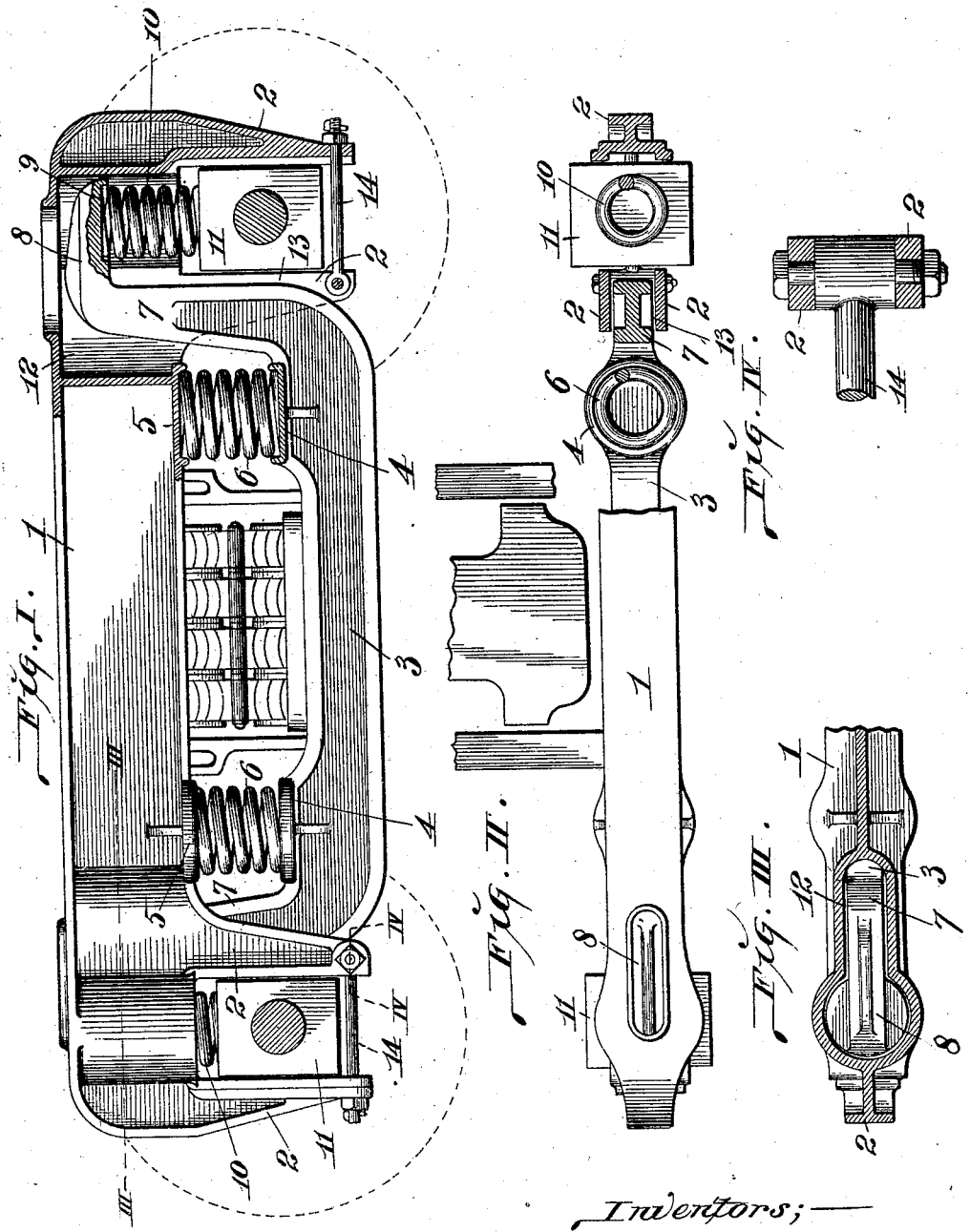
Inventors;
John Player and
George G. Floyd:
By Knight Bro
Atty's.

UNITED STATES PATENT OFFICE.

JOHN PLAYER, OF TOPEKA, KANSAS, AND GEORGE G. FLOYD, OF ST. LOUIS, MISSOURI, ASSIGNORS, BY MESNE ASSIGNMENTS, TO AMERICAN STEEL FOUNDRIES, A CORPORATION OF NEW JERSEY.

CAR-TRUCK.

SPECIFICATION forming part of Letters Patent No. 718,580, dated January 13, 1903.

Application filed August 4, 1902. Serial No. 118,286. (No model.)

*To all whom it may concern:*

Be it known that we, JOHN PLAYER, residing at Topeka, in the county of Shawnee and State of Kansas, and GEORGE G. FLOYD, residing in the city of St. Louis, in the State of Missouri, citizens of the United States, have invented certain new and useful Improvements in Car-Trucks, of which the following is a full, clear, and exact description, reference being had to the accompanying drawings, forming part of this specification.

Our invention relates to the manner of constructing and arranging the side frames and equalizing-bars of a car-truck, whereby the bars can be spring-supported on the axle-boxes and at the same time securely held in position.

Our invention consists in features of novelty hereinafter fully described, and pointed out in the claims.

Figure I is a side view, part in section, of one of the side frames and equalizing-bars of our improved truck. Fig. II is a plan view, part in section. Fig. III is a detail horizontal section taken on line III III, Fig. I. Fig. IV is an enlarged detail horizontal section taken on line IV IV, Fig. I.

1 represents one of the side frames of the truck, made of cast-steel and having the usual pedestal-arms 2.

3 is the equalizer-bar, which is also preferably made of cast-steel. The upper face of the bar is provided with seats 4 and the under face of the side frame with seats 5, and between these seats are located the truck-springs 6. The outer ends of the bar have long upwardly-extending arms 7, that terminate in horizontal projections 8, provided with spring-seats 9 in their lower faces for the reception of the upper ends of springs 10, the lower ends of which rest on the axle-boxes 11 of the truck. The equalizing-bars are thus spring-supported on the axle-boxes, the springs acting in conjunction with the springs 6 to provide a perfect cushion for the side frame. The outer ends of the side frame are formed with chambers 12 to receive the upper ends of the equalizing-bars, and the inner arms of the pedestals are formed with slots 13 for the passage of the arms of the equalizer-bar. The equalizing-bars are thus very securely held in place, and the structure is compact and neat in appearance.

14 represents rods secured to the lower ends of the arms of the pedestals, beneath the axle-boxes.

We claim as our invention—

1. In a car-truck, the combination of a side frame, and an equalizing-bar having long upwardly-extending arms at its ends terminating in horizontal extensions formed with integral seats 9, on the under faces thereof to receive the upper ends of the springs that rest on the axle-boxes, substantially as set forth.

2. In a car-truck, the combination of a side frame having pedestals, the inner arms of which are slotted, and an equalizing-bar having long upwardly-extending arms at its outer ends that fit in said slots of the pedestal-arms, and having horizontal extensions formed with integral seats 9, on the under faces thereof to receive the upper ends of springs that rest on the axle-boxes, substantially as set forth.

3. In a car-truck, the combination of a side frame having chambered ends and slotted inner pedestal-arms, and an equalizing-bar having long upwardly-extending arms terminating in horizontal projections providing integral seats 9, on the under faces thereof for springs that rest upon the axle-boxes; the arms of said equalizing-bar passing through said slotted pedestal-arms and the upper ends thereof being located in said chambers of the side frame, substantially as set forth.

JOHN PLAYER.
GEO. G. FLOYD.

In presence of—
J. E. SCHWAB,
CLARENCE H. HOWARD.